(12) United States Patent
Guner et al.

(10) Patent No.: US 11,149,537 B2
(45) Date of Patent: Oct. 19, 2021

(54) CALIBRATION OF ELECTROMAGNETIC RANGING TOOLS

(71) Applicant: Halliburton Energy Services, Inc., Houston, TX (US)

(72) Inventors: Baris Guner, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/545,246

(22) PCT Filed: Sep. 27, 2016

(86) PCT No.: PCT/US2016/053986
§ 371 (c)(1),
(2) Date: Jul. 20, 2017

(87) PCT Pub. No.: WO2018/063162
PCT Pub. Date: Apr. 5, 2018

(65) Prior Publication Data
US 2019/0203580 A1    Jul. 4, 2019

(51) Int. Cl.
*E21B 47/0228*    (2012.01)
*G01V 13/00*    (2006.01)
(Continued)

(52) U.S. Cl.
CPC ...... *E21B 47/0228* (2020.05); *E21B 47/0232* (2020.05); *E21B 49/00* (2013.01);
(Continued)

(58) Field of Classification Search
CPC ...... E21B 47/02216; E21B 49/00; E21B 7/04; E21B 43/2406; G01V 3/20; G01V 3/28; G01V 13/00
See application file for complete search history.

(56) References Cited

U.S. PATENT DOCUMENTS 3,760,414 A * 9/1973 Nicolson ............ B60K 31/0008
342/21
5,067,096 A * 11/1991 Olson ..................... F42C 13/06
102/425
(Continued)

FOREIGN PATENT DOCUMENTS

WO    2013105969    7/2013
WO    2014089490 A1    6/2014
(Continued)

OTHER PUBLICATIONS

International Search Report and Written Opinion for Application No. PCT/US2016/053986 dated May 10, 2017.
(Continued)

*Primary Examiner* — Douglas Kay
(74) *Attorney, Agent, or Firm* — Benjamin Ford; C. Tumey Law Group PLLC (57) ABSTRACT

A method and electromagnetic ranging system for determining the location of a target well. A method may comprise taking a first measurement with an electromagnetic ranging tool at a first position and calculating a first modeled signal. Additionally, calculating a calibration for the electromagnetic ranging tool from at least the first measurement and the first modeled signal, taking a second measurement with the electromagnetic ranging tool at a second position, and calculating a calibrated measurement. The method may comprise determining a distance, direction, and/or orientation to a target wellbore using at least the calibrated measurement. An electromagnetic ranging system may comprise an electromagnetic ranging tool and an information handling system coupled to the electromagnetic ranging tool. The information handling system may be operable to calibrate the electromagnetic ranging tool, calculate a gain of the
(Continued)

electromagnetic ranging tool, and apply the gain to a measured signal from the electromagnetic ranging tool.

17 Claims, 7 Drawing Sheets

(51) Int. Cl.
| | |
|---|---|
| *G01V 3/30* | (2006.01) |
| *E21B 47/0232* | (2012.01) |
| *E21B 49/00* | (2006.01) |
| *G01V 3/20* | (2006.01) |
| *G01V 3/28* | (2006.01) |
| *E21B 7/04* | (2006.01) |
| *E21B 43/24* | (2006.01) |

(52) U.S. Cl.
CPC .................. *G01V 3/20* (2013.01); *G01V 3/28* (2013.01); *G01V 3/30* (2013.01); *G01V 13/00* (2013.01); *E21B 7/04* (2013.01); *E21B 43/2406* (2013.01)

(56) References Cited

U.S. PATENT DOCUMENTS

| | | | | |
|---|---|---|---|---|
| 6,100,696 | A * | 8/2000 | Sinclair | G01V 3/28 |
| | | | | 324/339 |
| 7,414,391 | B2 * | 8/2008 | Homan | G01V 13/00 |
| | | | | 324/202 |
| 7,584,081 | B2 * | 9/2009 | Wen | E21B 43/00 |
| | | | | 703/2 |
| 8,517,094 | B2 * | 8/2013 | Sweatman | E21B 33/13 |
| | | | | 166/250.08 |
| 9,036,135 | B2 * | 5/2015 | Giacotto | G01C 3/08 |
| | | | | 356/5.01 |
| 9,506,326 | B2 | 11/2016 | Hay et al. | |
| 9,534,488 | B2 | 1/2017 | Derr et al. | |
| 9,568,633 | B2 | 2/2017 | Goodman et al. | |
| 9,625,605 | B2 | 4/2017 | San Martin et al. | |
| 10,036,827 | B2 * | 7/2018 | Homan | G01V 3/28 |
| 10,145,232 | B2 * | 12/2018 | Wu | G01V 3/28 |
| 10,208,584 | B2 * | 2/2019 | Wilson | E21B 7/04 |
| 10,302,796 | B2 * | 5/2019 | Wilson | G01H 9/004 |
| 2003/0174088 | A1 * | 9/2003 | Dizaji | G01S 7/2927 |
| | | | | 342/93 |
| 2006/0124360 | A1 * | 6/2006 | Lee | E21B 43/305 |
| | | | | 175/61 |
| 2007/0270983 | A1 * | 11/2007 | Yasui | F02D 35/023 |
| | | | | 700/31 |
| 2010/0044108 | A1 | 2/2010 | Bespalov et al. | |
| 2012/0061143 | A1 | 3/2012 | Hay et al. | |
| 2012/0078558 | A1 * | 3/2012 | Pelegri | G01V 13/00 |
| | | | | 702/85 |
| 2012/0150414 | A1 * | 6/2012 | Huang | F02D 35/024 |
| | | | | 701/101 |
| 2013/0135606 | A1 * | 5/2013 | Giacotto | G01C 3/08 |
| | | | | 356/5.01 |
| 2014/0035586 | A1 * | 2/2014 | Rodney | G01V 3/081 |
| | | | | 324/326 |
| 2014/0278300 | A1 * | 9/2014 | Lipowitz | G06F 17/5009 |
| | | | | 703/2 |
| 2014/0374159 | A1 * | 12/2014 | McElhinney | E21B 44/00 |
| | | | | 175/45 |
| 2015/0091577 | A1 | 4/2015 | Donderici et al. | |
| 2015/0219783 | A1 | 8/2015 | Sitka et al. | |
| 2015/0241596 | A1 * | 8/2015 | Donderici | G01V 13/00 |
| | | | | 324/338 |
| 2015/0268371 | A1 * | 9/2015 | Donderici | G01V 3/081 |
| | | | | 324/346 |
| 2016/0003029 | A1 | 1/2016 | Hay et al. | |
| 2016/0018509 | A1 * | 1/2016 | McCorkle | G01S 3/146 |
| | | | | 342/386 |
| 2016/0116623 | A1 | 4/2016 | Golla et al. | |
| 2016/0141882 | A1 * | 5/2016 | Ichikawa | H02J 7/025 |
| | | | | 307/104 |
| 2016/0201450 | A1 | 7/2016 | Donderici | |
| 2016/0216397 | A1 | 7/2016 | Donderici et al. | |
| 2016/0252644 | A1 | 9/2016 | Fouda et al. | |
| 2016/0259079 | A1 | 9/2016 | Wilson et al. | |
| 2016/0273343 | A1 | 9/2016 | Donderici et al. | |
| 2016/0369626 | A1 | 12/2016 | Donderici et al. | |
| 2017/0009566 | A1 | 1/2017 | Fan et al. | |
| 2017/0090061 | A1 | 3/2017 | Fouda et al. | |
| 2018/0052185 | A1 * | 2/2018 | Kniffin | G01D 18/008 |
| 2019/0094405 | A1 * | 3/2019 | Itskovich | G01V 3/28 |

FOREIGN PATENT DOCUMENTS

| | | |
|---|---|---|
| WO | 2014089505 | 6/2014 |
| WO | 2015147800 | 10/2015 |
| WO | WO-2015160347 A1 * | 10/2015 |
| WO | 2016080968 | 5/2016 |

OTHER PUBLICATIONS

"New Logging-While-Drilling Ranging Technique for SAGD: Theory and Experiment" by Bittar et al dated Oct. 8, 2012.

"An Electromagnetic Survey Method for Directionally Drilling a Relief Well Into a Blown Out Oil or Gas Well" by Kuckes et al dated Oct. 11, 1983.

Canadian Search Report for Application No. 3,029,187 dated Nov. 27, 2019.

* cited by examiner

CALIBRATION OF ELECTROMAGNETIC RANGING TOOLS

BACKGROUND

The present disclosure relates to a system and method for electromagnetic ranging. Specifically, methods and systems may be disclosed for in situ calibration of an electromagnetic ranging tool.

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") application, wherein the second wellbore may be an injection wellbore while the target wellbore may be a production wellbore. Yet another application may be where knowledge of the target wellbore's location may be needed to avoid collision during drilling of the second wellbore.

Electromagnetic ranging tools may be employed in subterranean operations to determine direction and distance between two wellbores. Electromagnetic ranging tools may use different techniques to obtain current on a conductive member in the target wellbore. Without limitation, approaches may include directly injecting a current into the conductive member and/or inducing a current on a conductive member by transmitting electromagnetic waves by coil antennas positioned in a second wellbore. The induced current in turn may cause the casing to radiate a secondary electromagnetic field. In another approach, an electrode type source may be used to induce current on the conductive member. The gradient of the magnetic field radiated by the conductive member in addition to the magnetic field itself may be measured. Using a relationship between the magnetic field and its gradient, a ranging measurement may be calculated. However, use of gradient calculations may be problematic as an infinite pipe with a constant induced current may be assumed, which may lead to larger errors in determining range. Alternatively, an inversion may be used to determine the range, in which a forward model of the signal that may be received at the ranging tool may be needed. The inversion process may try to find the formation and well parameters that would match the forward model with the measurements made by the tool. However, use of the inversion process may be problematic as the gain of the electromagnetic ranging tool may be different from that used in the forward model.

BRIEF DESCRIPTION OF THE DRAWINGS

These drawings illustrate certain aspects of some of the examples of the present invention, and should not be used to limit or define the invention.

DETAILED DESCRIPTION

The present disclosure relates generally to a system and method for calibrating an electromagnetic ranging system. More particularly, the electromagnetic ranging system may be calibrated in situ, for example, during drilling operations, and optionally on the surface. Calibration of the electromagnetic ranging system may help in determining the orientation and position of an underground well accurately and efficiently. An electromagnetic ranging system may comprise an electromagnetic ranging tool, which may comprise a transmitter and/or receiver. Transmission of electromagnetic fields by the transmitter and recording of signals by the receiver may be controlled by an information handling system.

Certain examples of the present disclosure may be implemented at least in part with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EE- PROM), and/or flash memory; as well as communications media such wires, optical fibers, microwaves, radio waves, and other electromagnetic and/or optical carriers; and/or any combination of the foregoing.

Figure 1:
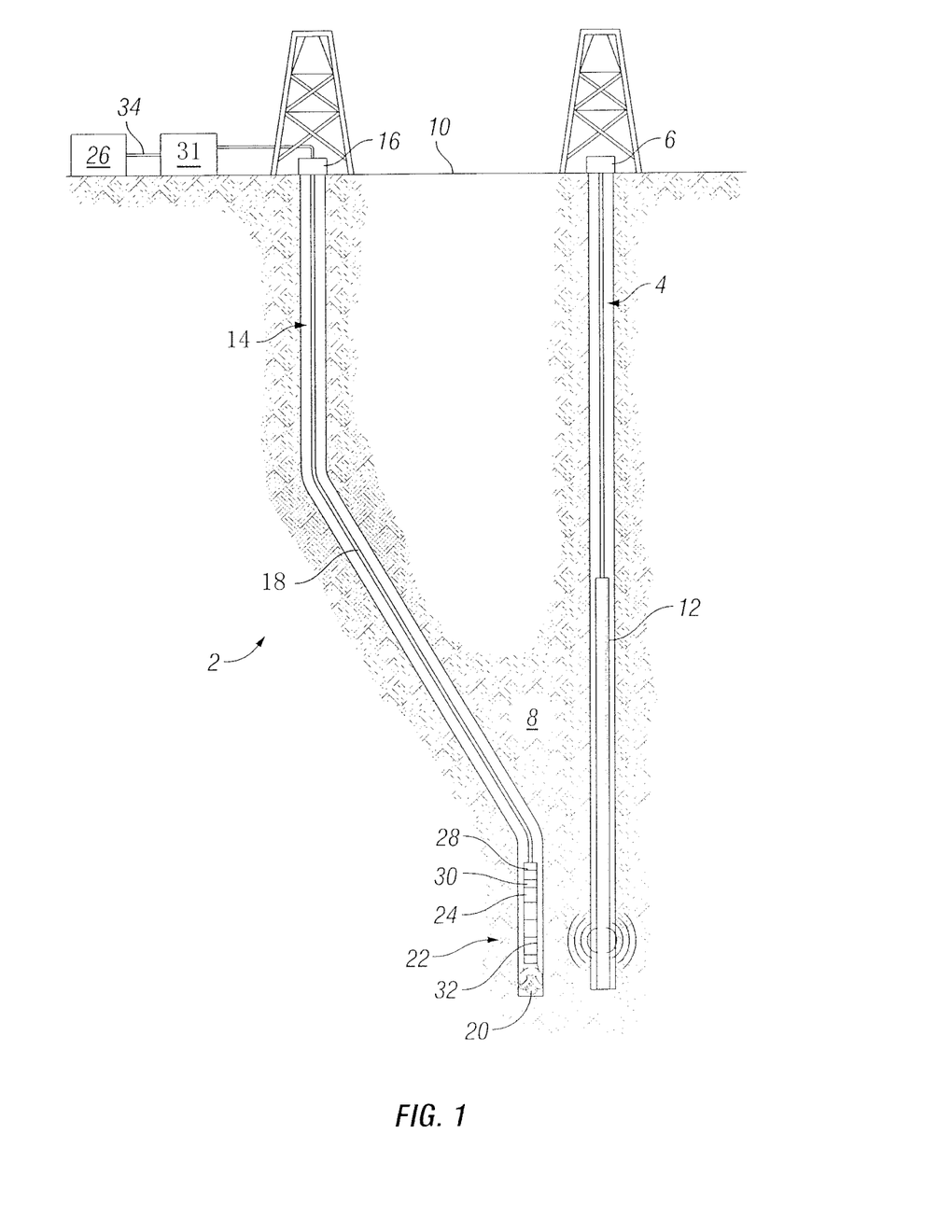
FIG. 1 illustrates use of an example of an electromagnetic ranging system in a wellbore.

FIG. 1 illustrates an electromagnetic ranging system 2. As illustrated, a target wellbore 4 may extend from a first wellhead 6 into a subterranean formation 8 from a surface 10. Generally, target wellbore 4 may include horizontal, vertical, slanted, curved, and other types of wellbore geometries and orientations. Target wellbore 4 may be cased or uncased. A conductive member 12 may be disposed within target wellbore 4 and may comprise a metallic material that may be conductive. By way of example, conductive member 12 may be a casing, liner, tubing, or other elongated metal tubular disposed in target wellbore 4. Determining the position and direction of target wellbore 4 accurately and efficiently may be required in a variety of applications. For example, target wellbore 4 may be a "blowout" well. Target wellbore 4 may need to be intersected precisely by a second wellbore 14 in order to stop the "blowout." Alternatively, it may be desired to avoid collision with target wellbore 4 in drilling second wellbore 14 or it may be desired to drill the second wellbore parallel to the target wellbore 4, for example, in SAGD applications. In examples, target wellbore 4 may not be accessible and/or information about the position and structure of target wellbore 4 may not be available. As will be discussed in more detail, electromagnetic ranging system 2 may be used for determining the location of target wellbore 4 with respect to second wellbore 14.

With continued reference to FIG. 1, second wellbore 14 may also extend from a second wellhead 16 that extends into subterranean formation 8 from surface 10. Generally, second wellbore 14 may include horizontal, vertical, slanted, curved, and other types of wellbore geometries and orientations. Additionally, while target wellbore 4 and second wellbore 14 are illustrated as being land-based, it should be understood that the present techniques may also be applicable in offshore applications. Second wellbore 14 may be cased or uncased. In examples, a drill string 18 may begin at second wellhead 16 and traverse second wellbore 14. A drill bit 20 may be attached to a distal end of drill string 18 and may be driven, for example, either by a downhole motor and/or via rotation of drill string 18 from surface 10. The drill bit 20 may be a part of bottom hole assembly 22 at distal end of drill string 18. While not illustrated, bottom hole assembly 22 may further comprise one or more of a mud motor, power module, steering module, telemetry subassembly, and/or other sensors and instrumentation as will be appreciated by those of ordinary skill in the art. As will be appreciated by those of ordinary skill in the art, bottom hole assembly 22 may be a measurement-while drilling or logging-while-drilling system.

Without limitation, electromagnetic ranging system 2 may comprise an electromagnetic ranging tool 24. Electromagnetic ranging tool 24 may be a part of bottom hole assembly 22. Electromagnetic ranging tool 24 may be used for determining the distance and direction to target wellbore 4. Additionally, electromagnetic ranging tool 24 may be connected to and/or controlled by information handling system 26, which may be disposed on surface 10. In examples, information handling system 26 may communicate with electromagnetic ranging tool 24 through a communication line (not illustrated) disposed in (or on) drill string 18. In examples, wireless communication may be used to transmit information back and forth between information handling system 26 and electromagnetic ranging tool 24. Information handling system 26 may transmit information to electromagnetic ranging tool 24 and may receive as well as process information recorded by electromagnetic ranging tool 24. In addition, electromagnetic ranging tool 24 may include a downhole information handling system 28, which may also be disposed on bottom hole assembly 22. Downhole information handling system 28 may include, without limitation, a microprocessor or other suitable circuitry, for receiving and processing signals received by the electromagnetic ranging tool 24. Downhole information handling system 28 may further include additional components, such as memory, input/output devices, interfaces, and the like. While not illustrated, the electromagnetic ranging tool 24 may include one or more additional components, such as analog-to-digital converter and amplifier, among others, that may be used to process the measurements of the electromagnetic ranging tool 24 before they may be transmitted to surface 10. Alternatively, raw measurements from electromagnetic ranging tool 24 may be transmitted to surface 10.

In examples, electromagnetic ranging tool 24 may comprise a transmitter 30 and/or a receiver 32. It should be noted that electromagnetic ranging tool 24 may comprise a plurality of transmitters 30 and/or a plurality of receivers 32. The transmitter 30 and receiver 32 may be disposed along a longitudinal axis of the electromagnetic ranging tool 24. Any of a variety of different transmitters 30 and receivers 32 for generating and measuring electromagnetic fields may be suitable for use, including, but not limited to, coil antenna, wire antenna, toroidal antenna and/or azimuthal button electrodes. Magnetometers may also be used as the receiver 30. Without limitation, transmitter 30 may be energized, which may be controlled by information handling system 26 and/or downhole information handling system 28, to produce a magnetic field that may be emitted into subterranean formation 8. The magnetic field may energize conductive member 12 within target wellbore 4 by inducing eddy currents in conductive member 12. While FIG. 1 shows transmitter 30 on electromagnetic ranging tool 24, transmitter 30 may be omitted and conductive member 12 may be energized using alternative techniques, such as by coupling a current source directly to conductive member 12 to generate currents. The currents within conductive member 12 may in turn produce a secondary magnetic field. This secondary magnetic field may radiate from target wellbore 4. In examples, the secondary magnetic field may induce voltages in receiver 30 that may be recorded and transmitted to surface 10. Using these recorded voltages, the location of target wellbore 4 may be determined. By way of example, the direction and distance of target wellbore 4 may be determined with respect to second wellbore 14.

Any suitable technique may be used for transmitting signals from electromagnetic ranging tool 24 to surface 10, including, but not limited to, mud-pulse telemetry, acoustic telemetry, and electromagnetic telemetry. While not illustrated, bottom hole assembly 22 may include a telemetry subassembly that may transmit telemetry data to the surface. Without limitation, a transmitter in the telemetry subassembly may be operable to generate pressure pulses in the drilling fluid that propagate along the fluid stream to surface 10. At surface 10, pressure transducers (not shown) may convert the pressure signal into electrical signals for a digitizer 31. Digitizer 31 may supply a digital form of the telemetry signals to information handling system 26 via a communication link 34, which may be a wired or wireless link. The telemetry data may be analyzed and processed by information handling system 26. For example, the telemetry data could be processed to determine location of target wellbore 4. With the location of target wellbore 4, a driller could control the bottom hole assembly 22 while drilling second wellbore 14 to intentionally intersect target wellbore 4, avoid target wellbore 4, and/or drill second wellbore 14 in a path parallel to target wellbore 4.

To accurately determine the position of target wellbore 4, including distance and direction, electromagnetic ranging system 2 may be calibrated to ensure accurate measurements. For example, calibrated signals may be used to determine a location of target wellbore 4. Based on the calibrated signal, drilling parameters of second wellbore 14 may be adjusted, for example, to cause bottom hole assembly 22 to intentionally intersect target wellbore 4, avoid target wellbore 4, and/or drill second wellbore 14 in a path parallel to target wellbore 4. Calibration may be performed to take into account the gain within electromagnetic ranging system 2. This is because the gain of the electromagnetic ranging system 2 may differ from the gain used in the forward model for inversion, the gain may differ between different electromagnetic ranging tools 24 even if they have the same design, and the same electromagnetic ranging tool 24 may even needed to be re-calibrated for different runs due to differences in gain.

As disclosed, gain represents the mismatch between the measurements taken and the derived model. Gain may fluctuate over time, if these gain fluctuation are not corrected, then they may produce errors in the determination of the location of a target wellbore 4. This may reduce accuracy, which may be particularly important in well avoidance applications where the position of a target wellbore 4 may be determined in advance and the drilling path may be changed based on measurements from electromagnetic ranging tool 24. Additionally, in well intersection applications, a slight mistake may only aggravate the situation. Gain may vary between different devices within electromagnetic ranging system 2, which may make it difficult to properly account for gain in a forward model. Thus, recalibration may be performed before, during, and/or after an operation in which electromagnetic ranging system 2 may be used.

The calibration method may include an in situ calibration. In general, the calibration method may use known formation properties to calculate and correct gain where the target wellbore 4 is not present. The target wellbore 4 may be considered to not be present if the secondary magnetic fields emanating from it may be considered negligible compared to noise. The calibration method may be performed using information handling system 26 at surface 10, downhole information handling system 28, or a combination of information handling system 26 and downhole information handling system 28. The in situ calibration may include positioning the electromagnetic ranging tool 24 in a wellbore, such as second wellbore 14 and then using the electromagnetic ranging tool 24 to generate an electromagnetic field that emanates into subterranean formation 8. Receiver 30 may then be used to measure the electromagnetic field. Based on these measurements, and assuming a linear relation between model and the measurement, a gain coefficient may be calculated and applied to subsequent measurements. Optionally, a gain offset may also be calculated, in addition to the gain coefficient, and applied to subsequent measurements. Surface calibration may be combined with the in-situ calibration to maintain an accurate calibration during electromagnetic ranging operations.

Figure 2:
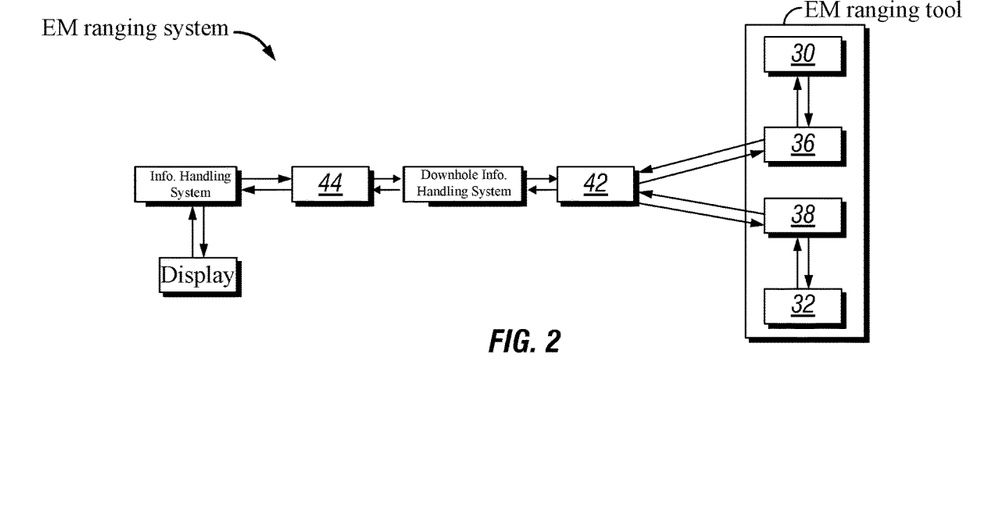
FIG. 2 is a block diagram of an example electromagnetic ranging system.

Referring now to FIG. 2, a block diagram illustrating an example of electromagnetic ranging system 2 is illustrated. As illustrated, the electromagnetic ranging system 2 may comprise an electromagnetic ranging tool 24 that comprises a transmitter 30 and receiver 32. More than one transmitter 30 and more than one receiver 32 may also be used. The transmitter 30 may be coupled to transmitter electronics 36 and receiver 32 may be coupled to receiver electronics 38. The transmitter electronics 36 and receiver electronics 38 may include a variety of components, including analog-to-digital converters and amplifiers. Electromagnetic ranging tool 24 may be operable to generate and measure electromagnetic fields.

Electromagnetic ranging system 2 may further comprise information handling system 26 and downhole information handling system 28. As previously described, information handling system 26 may be disposed at surface 10 (e.g., shown on FIG. 1). The downhole information handling system 28, whether alone or in combination with information handling system 26, may be arranged to operate to control operation of electromagnetic ranging tool 24 and to perform operations on the signals collected by receiver 32 to calibrate the electromagnetic ranging system 2. The downhole information handling system 28, whether alone or in combination with information handling system 26, may be operable to perform operations according to the calibration disclosed herein. By way of example, downhole information handling system 28, whether alone or in combination with information handling system 26, may include instructions stored thereon that when executed cause the downhole information handling system 28 to perform operations according to the disclosed calibration method. The downhole information handling system 28, whether alone or in combination with information handling system 26, may control activation of transmitter 30 to generate a signal for calibration and also control selection of receiver 32 to manage processing schemes. Information handling system 26, whether alone or in combination with downhole information handling system 28, may be operable to process measurements from receiver 32 to determine location of target wellbore 4. As illustrated, peripheral devices 40, such as a display unit (e.g., computer monitor) or input/out devices may be coupled to information handling system 26 at surface 10.

Electromagnetic ranging system 2 may further include a bus 42, where bus 42 may provide electrical conductivity between electromagnetic ranging tool 24 and downhole information handling system 28, for example. The bus 42 may include an address bus, a data bus, and a control bus, each independently configured or in an integrated format. The bus 42 may be realized using a number of different communication mediums that allow for the distribution of components of electromagnetic ranging system 2. Use of bus 42 may be regulated by downhole information handling system 28. Bus 42 may include a communication network.

The electromagnetic ranging system 2 may further include a telemetry subassembly 44, which may utilize any suitable technique for transmitting signals from downhole information handling system 28 to information handling system 26 at surface 10, including, but not limited to, mud-pulse telemetry, acoustic telemetry, and electromagnetic telemetry. By way of example, telemetry subassembly 44 may be operable to generate pressure pulses in the drilling fluid that propagate along the fluid stream to surface 10.

Figure 3:
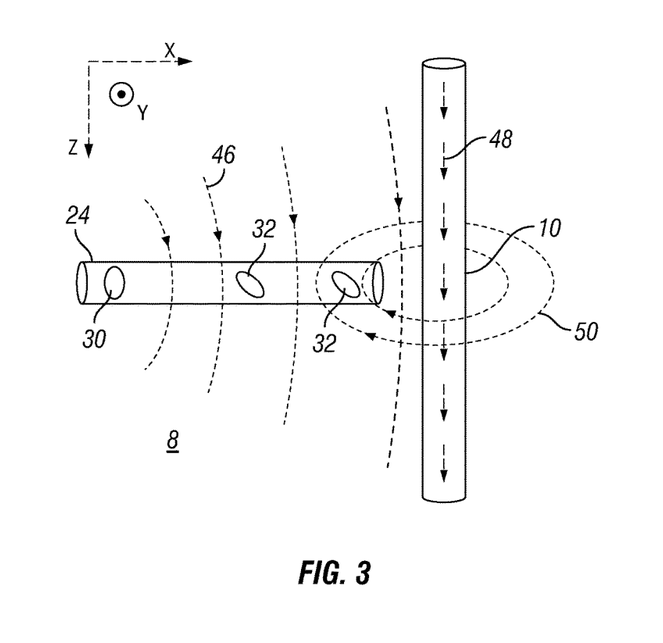
FIG. 3 illustrates use of an example electromagnetic ranging tool for coil excitation.
Figure 4:
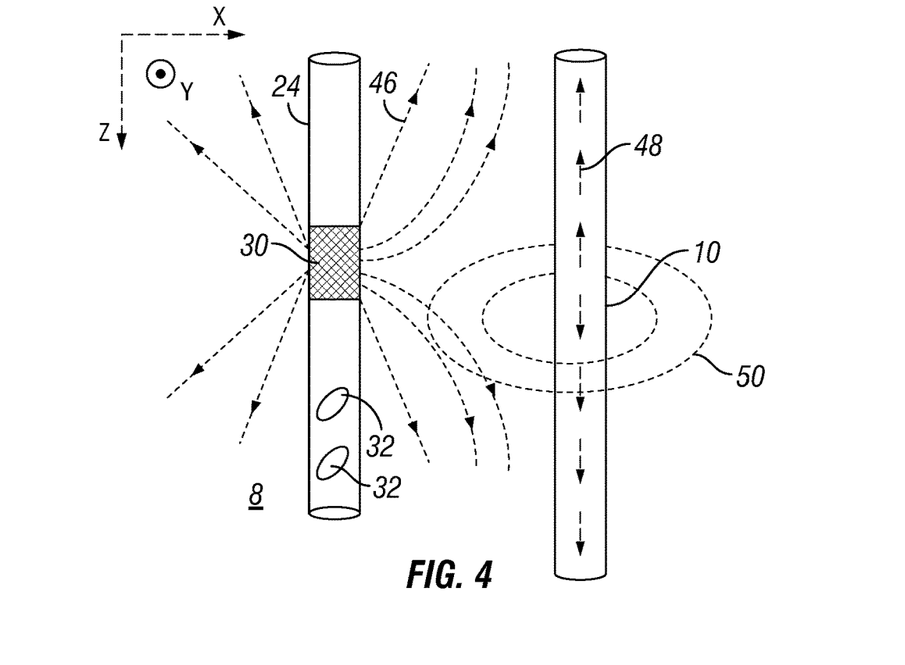
FIG. 4 illustrates use of an example electromagnetic ranging tool for electrode excitation.

The principles of operation of electromagnetic ranging tool 24 will now be described in more detail with respect to FIGS. 3 and 4. FIG. 3 illustrates the use of electromagnetic ranging tool 24 for coil excitation, and FIG. 4 illustrates the use of electromagnetic ranging tool 24 for electrode excitation. For simplicity, target wellbore 4 and second wellbore 14 are not shown in FIGS. 3 and 4, but electromagnetic ranging tool 24 may be disposed in second wellbore 14 and conductive member 12 may be disposed in target wellbore 4 as illustrated on FIG. 1. In both FIGS. 3 and 4, a cross-section of subterranean formation 8 in the x-z plane is shown in which subterranean formation 8 is assumed to be a homogeneous formation Referring now to FIG. 3, transmitter 30 in the form of a transmitting coil with a magnetic moment in the y-direction (e.g., a coil that lies in the x-z plane) may induce an electric field (E) in subterranean formation 8. The electric field lines 46 are provided on FIG. 3. As illustrated, conductive member 12 may be present and have its principal axis lying in the z-direction. Since the conductive member 12 may be more conductive than subterranean formation 8 surrounding it, a strong coupling of the electric field (E) to the conductive member 12 may occur. This coupling may produce a conductive current (represented by current lines 48) on the conductive member 12 and in turn a secondary magnetic field. As illustrated, by secondary magnetic field lines 50, the secondary magnetic field may be represented as concentric closed loops in a homogenous formation.

Turning now to FIG. 4, use of electromagnetic ranging tool 24 for electrode excitation will now be described. As illustrated, transmitter 30 in the form of an electrode may induce an electric field ($\vec{E}$) with electric field lines 46 that emanate directly into subterranean formation 8. As illustrated, conductive member 12 may be present and have its principal axis lying in the z-direction. Similar to coil excitation, the electric field ($\vec{E}$) may couple to conductive member 12 and produce a conductive current (represented by current lines 48) on the conductive member 12. However, due to the difference in shape of the electric field lines 46 for coil excitation and electrode excitation, the direction of the conductive current may be different on conductive member 12. The current on conductive member 12 may in turn generate a secondary magnetic field (e.g., represented by secondary magnetic field lines 50) that emanates into subterranean formation 8.

For both coil excitation and electrode excitation, the magnitude of the secondary magnetic field around conductive member 12 may be found via the Biot-Savart law. It should be noted that FIGS. 3 and 4 only illustrate secondary magnetic field lines 50 in a limited space, for simplicity. If the induced current on conductive member 12 was constant, the Biot-Savart law would reduce to Ampere's law, such as the one shown in Equation 1 below:

$$\vec{H} = \frac{I}{2\pi r}\hat{\phi} \quad (1)$$

Wherein r is the radial distance from the target wellbore 4 to the measurement point ($\vec{r}$) assuming a cylindrical coordinate system where the z-axis coincides with the axis of the cylinder, $\hat{\phi}$ is a unit vector in azimuthal direction for this coordinate system, and H is the magnetic field at point ($\vec{r}$). The equation may be used in electromagnetic ranging tools, such as electromagnetic ranging tool 24, to calculate gradient of the received field in addition to the electromagnetic field itself and calculating the distance to the target wellbore 4 by taking a ratio of the gradient and the electromagnetic field. However, to avoid errors due to assumptions that induce current on conductive member 12 may be constant, inversion may be used.

Figure 5:
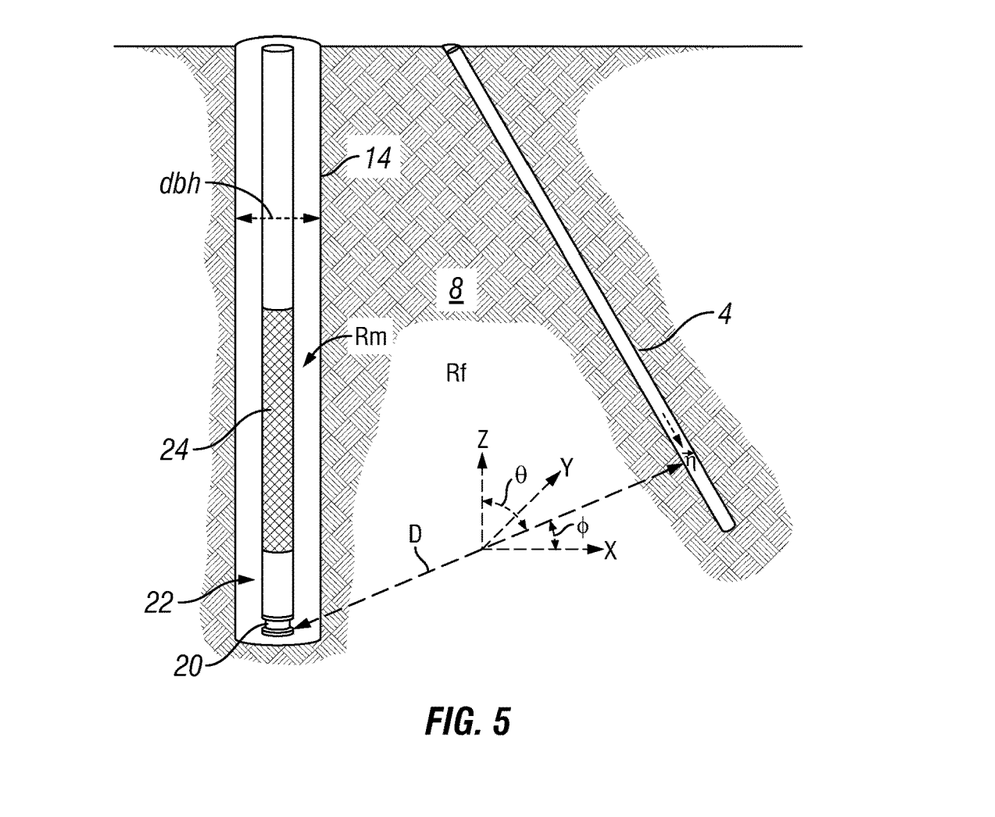
FIG. 5 illustrates ranging geometry for use in inversion.

Referring now to FIG. 5, ranging geometry is illustrated that may be used for constructing an example inversion. As illustrated, electromagnetic ranging tool 24 may be disposed in second wellbore 14 for use in determination location of target wellbore 4. In examples, location of target wellbore 4 may be determined with respect to second wellbore 14. Electromagnetic ranging tool 24 may be assumed to be in the z-direction in the Cartesian coordinate system. Target wellbore 4 may be at a distance D away from a reference point on bottom hole assembly 22. In this example, the reference point may be the tip of drill bit 20. The inclination and azimuth of target wellbore 4 with respect to electromagnetic ranging tool 24 may be shown as θ and φ, respectively, and $\vec{n}$ may be a unit vector parallel to a direction of target wellbore 4. The drilling mud in second wellbore 14 may have a mud resistivity of Rm. Second wellbore 14 may have a diameter of dbh. Subterranean formation 8 may have a resistivity of Rf.

Based on the ranging geometry illustrated on FIG. 5, an example inversion may be constructed to solve for parameters (D, θ, φ, and $\vec{n}$). This may be a total of 5 parameters, for example, as the unit vector ($\vec{n}$) may be defined using two of its components. An iterative type of inversion may be used or a look-up library search of proprietary information may be employed. As previously noted, inversion may use a forward model that simulates the signal that would be measured at receiver 32 of electromagnetic ranging tool 24 for a specific target well position and orientation. Parameters such as formation resistivity Rf, mud resistivity Rm, and borehole diameter dbh may be found using other tools are assumed to be known for the inversion. Additional parameters that may impact the measurements may also be incorporated into the forward model such as the target wellbore 4 diameter, target wellbore 4 resistivity, and permeability, but they are not discussed herein for simplicity. The inversion may then be implemented to find the parameters that minimize a cost function, wherein the cost function may be the difference between the forward model and actual measurements recorded by electromagnetic ranging system 2.

In an iterative inversion, whenever a measurement may be made at the receiver 32 of the electromagnetic ranging tool 24 (e.g., which may be written as the matrix $\overline{S}$), an initial guess of the target wellbore 4 position may be made and using other parameters, for example, that may be assumed to be known. Based on the value of the cost function, an updated guess may be calculated until the iteration converges to a solution or a maximum number of iterations is achieved. It should be noted that the measured signal $\overline{S}$ may include different transmitter-receiver configurations and different operating frequencies, among others. Furthermore, in logging-while-drilling systems, for example, the measured signal $\overline{S}$ may also include measurements at different azimuthal bins or this azimuthal information may be averaged out. In an inversion utilizing proprietary information, cost functions between the measured signal $\overline{S}$ and a library of modelling results (e.g., modeled signals $\overline{M}$) may be calculated and then a parameter set that corresponds to the minimum cost function may be returned as the answer, for example.

As described above in the description of inversion, parameters, without limitation, such as mud resistivity, formation resistivity, and second wellbore 14 diameter, may be found and placed into a forward model. In the following paragraphs, various non-limiting techniques for determination of mud resistivity, formation resistivity, and second wellbore 14 diameter will be described. It should be understood that the following description is merely illustrative and other techniques may be used to calculate these parameters.

An example technique for determining second wellbore 14 diameter may use a caliper tool. By way of example, a caliper tool (not illustrated) may be disposed on bottom hole assembly 22 and used to measure the diameter of second wellbore 14. The caliper tool may comprise several legs, which may be opened to touch the wall of second wellbore 14. Based on the distance the legs may open, the second wellbore 14 diameter may be accurately measured and logged. The caliper tool may also be used to provide information related to eccentricity and caving, which may further be incorporated into a forward model.

An example technique for measuring mud resistivity may use a mud sensor. In examples, the mud sensor may have a very shallow depth of investigation. The mud sensor may emit a current into second wellbore 14 and measure the voltage drop to calculate mud resistivity. The mud resistivity may then be placed into the forward model.

Figure 6:
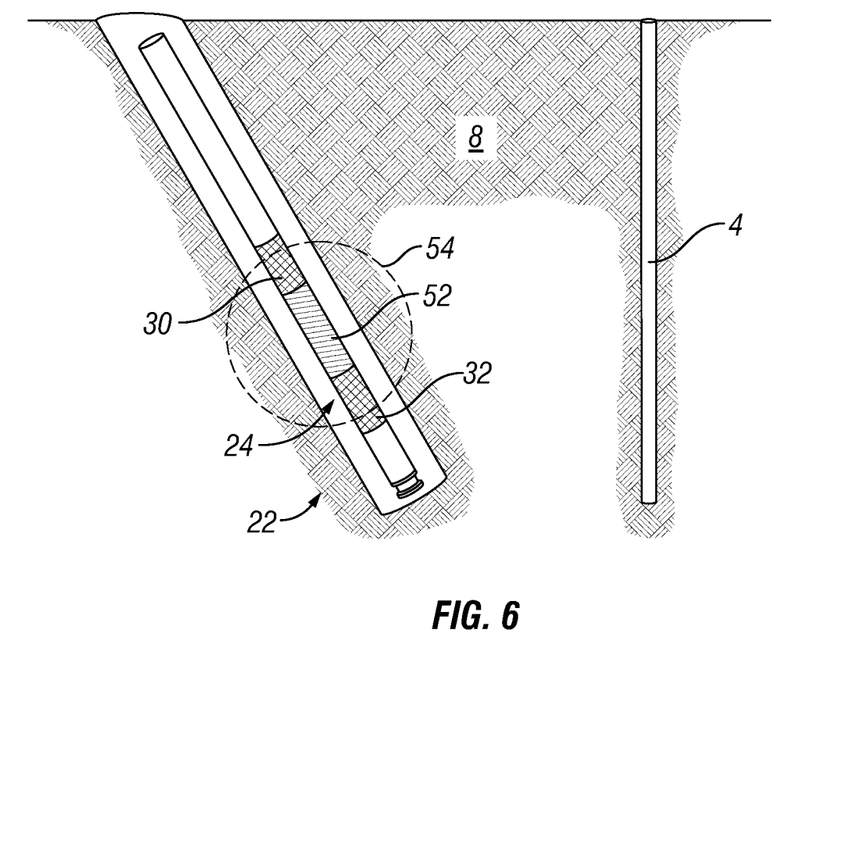
FIG. 6 illustrates an example of an electromagnetic ranging tool with a resistivity tool.

An example technique for measuring formation resistivity may use a resistivity tool. FIG. 6 illustrates inclusion of a resistivity tool 52 on bottom hole assembly 22. As illustrated, resistivity tool may be disposed between various sections of electromagnetic ranging tool 24, such as between transmitter 30 and receiver 32. Resistivity tool 52 may be an azimuthal and/or non-azimuthal propagation resistivity tool. To prevent interference between different tools, frequency of operation of resistivity tool 52 and electromagnetic ranging tool 24 may be selected to be different. Different frequencies of operation may also be required because the sensitivity to a formation and target well resistivity may be optimal at different frequencies. Filtering may be applied to reduce the interference further, and gap subs may be used to minimize coupling between electromagnetic ranging tool 24 and resistivity tool 52. In examples, resistivity tool 52 may have a volume that may be sensitive to the properties of a formation, illustrated as reference number 54 on FIG. 6, which may be different than the sensitive volume of electromagnetic ranging tool 24. Although subterranean formation 8 may be shown to be homogeneous, it should be understood that subterranean formation 8 may comprise different layers. Resistivity tool 52 (e.g., a propagation resistivity tool) may have a depth of investigation that may be less than twenty feet. To find formation resistivity at locations that may be further than 20 feet from resistivity tool 52, an interpolation may be performed, for example, using a geological model and the resistivity information from resistivity tool 52. Additionally, resistivity tool 52 may have different modes of operation with different depths of investigation that may benefit interpolation. Thus, the resistivity of subterranean formation 8 may be measured and used within forward modeling.

As previously described, gain of electromagnetic ranging system 2 may fluctuate over time and, if not corrected, may produce error in the determined position of target wellbore. In addition to in situ calibration, surface calibration may also be used, for example, to determine proper operation of electromagnetic ranging system 2. Surface calibration may be useful, for example, in early stages of tool deployment before in situ calibration may be available. Additionally, surface calibration may also ensure that the forward model used in subsequent in situ calibration does not have a large error at the beginning. Surface calibration may be performed by many different methods for coil and electrode type electromagnetic excitations. For example, electrode excitation may depend on galvanic principles, a resistor box may be used for calibration of the electrodes on the surface. Coil excitation may depend on induction principles, a calibration test coil may be used to calibrate electromagnetic ranging system 2 with coils on the surface.

Figure 7:
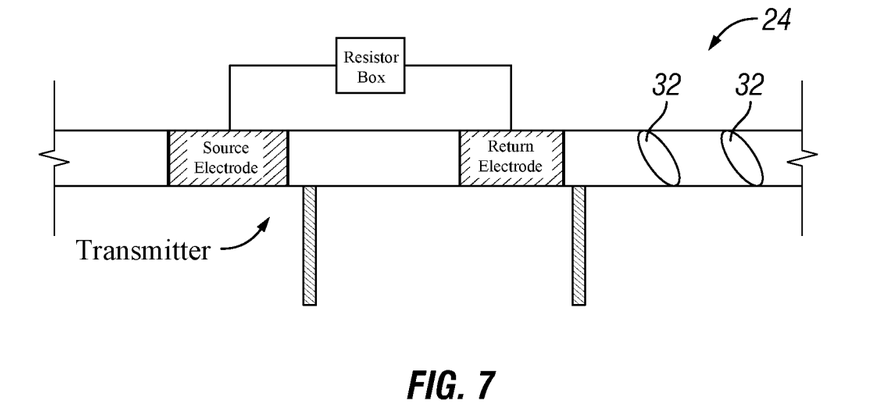
FIG. 7 illustrates an example of surface calibration of an electromagnetic ranging tool.

FIG. 7 illustrates an example surface calibration of an electromagnetic ranging tool 24 that may include electrode excitation. As illustrated, the electromagnetic ranging tool 24 may include a transmitter 30 and receivers 32. The transmitter 30 may include a source electrode 56 and a return electrode 58. A resistor box 60 may be connected between source electrode 56 and a return electrode 58. A voltage and/or a current may be applied between the source electrode and the return electrode, allowing for the measurement of a complex impedance. The properties of resistor box 60 may be known, which may allow an operator to model the expected response of electromagnetic ranging system 2. For example, an ideal current level that may be transmitted within electromagnetic ranging tool 24, when resistor box 60 may be connected, may be a known value. If the actual current level is different, electromagnetic ranging tool 24 may be adjusted accordingly to increase and/or decrease the gain within electromagnetic ranging tool 24. Additionally, electromagnetic ranging tool 24 may comprise multiple frequencies of operation and/or several transmitters, both of which may be calibrated separately.

Figure 8:
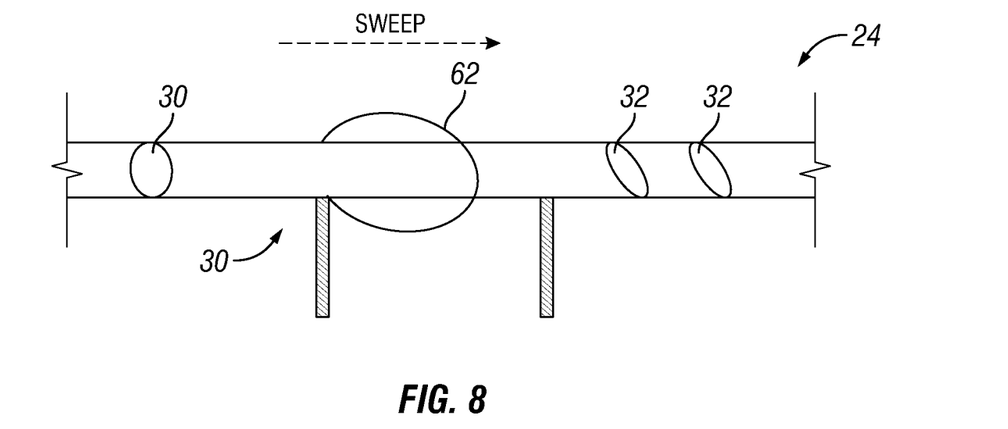
FIG. 8 illustrates another example of surface calibration of an electromagnetic ranging tool.

As illustrated in FIG. 8, calibration of an electromagnetic ranging tool 24 that may comprise coil excitation may be performed with test coil 62. The test coil 62 may comprise known conductivity that may be used to perform surface calibration. Gain within electromagnetic ranging tool 24 may be found by modeling the response of test coil 62 and comparing it with a measured response of electromagnetic ranging tool 24. This may be repeated for each combination of transmitter 30 and receivers 32. To increase accuracy, a sweep over electromagnetic ranging tool 24 may be performed, and the gain may be found at the location where the maximum signal at each receiver 32 may be observed. Calibration may be repeated for multiple frequencies in which electromagnetic ranging tool 24 may operate. In addition to determination of multiplicative gain coefficient described above, gain offset may also be calculated. Gain offset may be calculated, for example, with different resistor boxes for electrode excitation or different test loops for coil excitation.

Turning now to in-situ calibration, calibration may be performed while electromagnetic ranging tool 24 is disposed in second wellbore 14. Known formation properties may be used to calculate and correct the gain within electromagnetic ranging system 2. As previously described, in-situ calibration may be performed in addition to an optional surface calibration. In examples, calibration may take a first measurement with an electromagnetic ranging tool 24. The measurement may be implemented in calculating a first modeled signal $M°\ °$. As described below, the modeled signal $M°\ °$ and the first measurement may calibrate electromagnetic ranging tool 24 for further measurements. Calibrated, a second measurement may be performed by electromagnetic ranging tool 24. The calibrated measurement may determine the distance, direction, and/or orientation to a target wellbore 4. In-situ calibration may be performed in zones of subterranean formation 8 where target wellbore 4 may not be present. The target wellbore 4 (or other wellbores) may not be considered present if the secondary magnetic fields emanating from there is negligible compared to noise. Finding zones without other wellbores (e.g., target wellbore 4) may be accomplished in several ways. During the beginning of drilling operations, there may exist prior information about the presence of wells, which may allow operators to guide electromagnetic ranging system 2 to areas in which other wells may be far enough away for in-situ calibration. Additionally, data measured by electromagnetic ranging system 2 may be evaluated to determine the presence of other wells.

Figure 9:
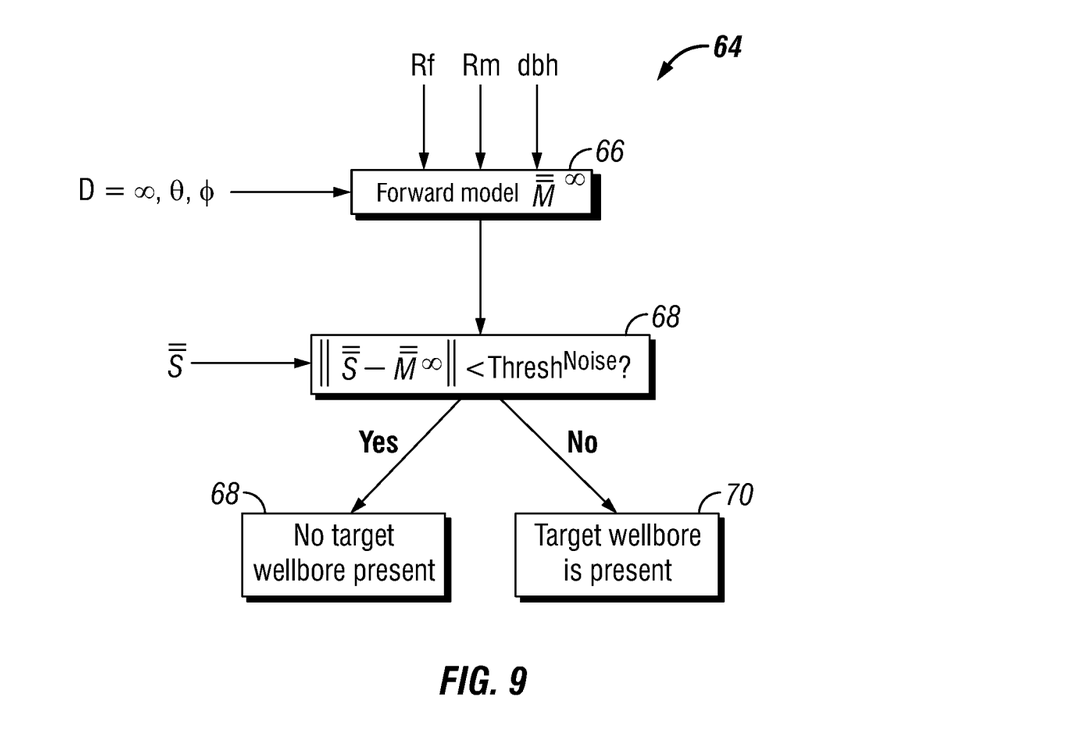
FIG. 9 illustrates a method for determining if target wellbore is present.

FIG. 9 illustrates a well detection method 64 that may be used to determine the presence of another well. As illustrated, at block 66, a forward model may be used to calculate a modeled signal $\overline{M}^\infty$ assuming there is no target wellbore 4. Inputs to the forward model may parameters, such as formation resistivity Rf, mud resistivity Rm, and second wellbore 14 diameter dbh. Determination of these parameters is described above. At block 68, the modeled signal $\overline{M}^\infty$ may be subtracted from a measured signal $\overline{S}$. To obtain the measured signal $\overline{S}$, the electromagnetic ranging tool 24 (e.g., shown on FIG. 1) may be used to generate an electromagnetic field with resultant field measurements being obtained at receiver 30. The result from the subtraction may be compared to a threshold base, which may be a noise floor of the electromagnetic ranging tool 24. The noise floor of the ranging tool may be described as the level below which the received signal may no longer be distinguishable from the noise generated by electromagnetic ranging tool 24 and the natural, environmental noises. In examples, the "noise floor" may be in the order of the expected value of the measured noise and may be calculated by making a measurement while electromagnetic ranging tool 24 may not transmitting. If the result from the subtraction is less than the threshold base, it may be assumed that target wellbore 4 is not present (block 68) and in-situ calibration may then be performed. However, if the subtraction is higher than the threshold base, target wellbore 4 may be present and inversion may be performed, for example, as described above, to identify the direction and distance of the target wellbore 4.

Although well detection method 64 shown on FIG. 9 may be used for determining the presence of target wellbore 4, a false detection of target wellbore 4 may occur in some instances. For example, well detection method 64 may falsely detect target wellbore 4 if gain fluctuation may be large, thus potentially preventing in-situ calibration. While large gain fluctuations may be minimized by use of surface calibration, as described above, secondary indicators of the presence of target wellbore 4 may also be applied. One technique for using a secondary indicator may comprise transmitter 30 and/or receiver 32 on electromagnetic ranging tool 24, in the form of tilted coils, since tilted coils may be capable of measuring cross-coupling components. While described with tilted coils, the techniques may also use other antenna capable of measuring cross-coupling components, such as multi-axial antennas. For a secondary indicator, the measured signal $\overline{S}$ may not be averaged out over azimuthal directions for a rotating tool, but rather data may be collected at different azimuthal bins. The tilted coil configuration may be able to obtain different components of the coupling. In a homogenous medium, a uniform signal with respect to the azimuth may be measured, while, for a non-homogenous medium, the measured signal may exhibit a sinusoidal variation with respect to the azimuth. If a target wellbore 4 may be present, the measured signal may exhibit double sinusoidal variation with respect to the azimuth, assuming the target wellbore 4 may be straight and not bent.

Figure 10:
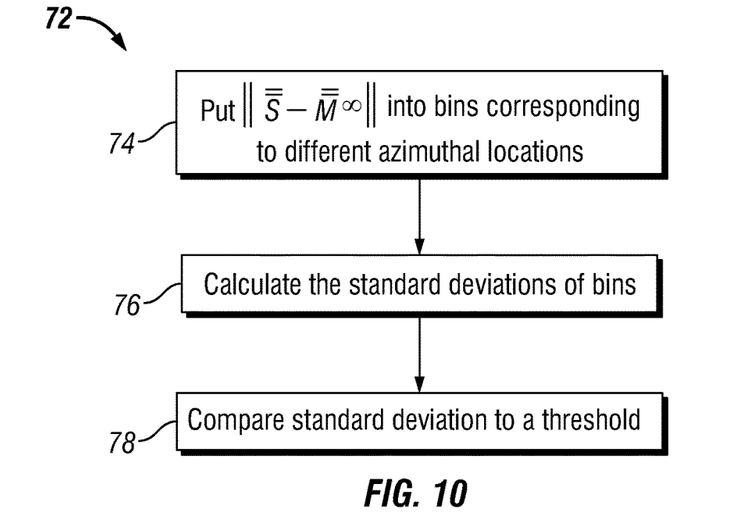
FIG. 10 illustrates a method for validating the method in FIG. 9, assuming a homogeneous formation model.

FIG. 10 illustrates a first validation method 72 for validating the method in FIG. 9, assuming a homogeneous formation model. In other words, the first validation method 72 may be used as secondary indicator to determine the presence of target wellbore 4. For example, the first validation method 72 may be used if the determination of a target wellbore 4 by another method, such as that described with respect to FIG. 9, was a false detection. First validation method 72 may utilize cross-coupling components of the electromagnetic field that may be measured in a tilted coil configuration, for example. As described above, in a homogenous formation, a uniform signal with respect to the azimuth may be measured. The first validation method 72 in general may compare the difference in the modeled signal $\overline{M}^\infty$ and the measured signal $\overline{S}$ at different azimuthal locations to determine if there was a false detection of target wellbore 4. A specific implementation of first validation method 72 may be described with reference to FIG. 10. At block 74, the difference in the modeled signal $\overline{M}^\infty$ and the measured signal $\overline{S}$ may be placed in bins corresponding to different azimuthal locations. At block 76, the standard deviation of the difference in the bins may be determined. At block 78, the standard deviation of the difference may be compared to a threshold. This threshold may again be calculated based on the expected noise characteristics of electromagnetic ranging tool 24 obtained through measurements. If the standard deviation of the difference is less than the threshold, then the difference in the signals may not be changing significantly at different azimuthal locations, indicating target wellbore 4 is not present. Accordingly, the detection of target wellbore 4 by the other technique may have been a false detection. In-situ calibration may then be performed as there is no target wellbore 4 present. However, if the standard deviation of the difference is greater than the threshold, then the difference in signals is changing significantly at different azimuthal locations, indicating target wellbore 4 is present.

Figure 11:
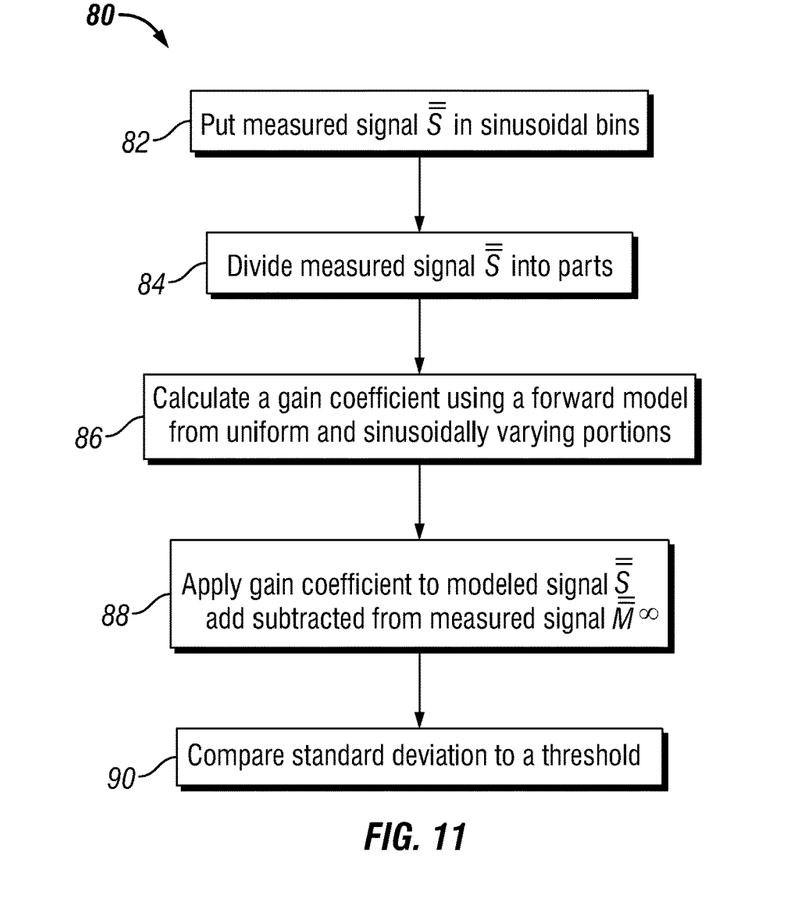
FIG. 11 illustrates a method for validating the method in FIG. 9, assuming a inhomogeneous formation model.

FIG. 11 illustrates a second validation method 80 for validating the method in FIG. 9, assuming a formation model that includes inhomogeneities. In other words, second validation method 80 may be used as a secondary indicator to determine the presence of target wellbore 4. Second validation method 80 may also be used if the determination of a target wellbore 4 by another method, such as that described with respect to FIG. 9 was a false detection. Second validation method 80 may utilize cross-coupling components of the electromagnetic field that may be measured in a tilted coil configuration, for example. As described above, in an inhomogeneous formation, measured signals may exhibit sinusoidal and/or double sinusoidal variations with respect to the azimuth. Accordingly, differences in the modeled signal $\overline{M}^\infty$ and the measured signal $\overline{S}$ at different azimuthal locations may be compared to determine if there was a false detection of target wellbore 4.

A specific implementation of second validation method 80 may be described with reference to FIG. 11. At block 82, the measured signal $\overline{S}$ may be put in different sinusoidal bins. The measured signal $\overline{S}$ may then be divided into parts (block 84), for example, with uniform azimuthal variation, sinusoidal azimuthal variation, and double sinusoidal variation. Dividing the measured signal $\overline{S}$ may be performed by sinusoidal fitting, for example, using a Fourier series expansion. At block 86, gain coefficient of the electromagnetic ranging tool 24 may be calculated using a forward model from uniform and sinusoidally varying portions of the measured signal. Specifically, sinusoidally varying portions of the measured signal may comprise the effect from the formation and not the target well, they may be simulated using the forward model with the known formation and electromagnetic ranging tool 24 parameters and applying sinusoidal fitting. Then, the gain coefficient may be obtained as a ratio of the sum of the uniform and sinusoidally varying portions of the model and the sum of the uniform and sinusoidally varying portions of the measurements. At block 88, the gain coefficient may be applied to the measured signal $\overline{S}$ and subtracting the corrected measured signal ($\tilde{G} \times \overline{S}$) from a modeled signal $\overline{M}^\infty$ the modeled signal $\overline{M}^\infty$ may be calculated, for example, using the previously described inversion. At block 90, a standard deviation of this difference between the modeled signal $\overline{M}^\infty$ and the corrected measured signal ($\tilde{G} \times \overline{S}$) may be compared to a threshold. The threshold may be based on the noise characteristics of electromagnetic ranging tool 24, calculated by measurements as described above. If the standard deviation of the difference is less than the threshold, then the difference in the signals may not be changing significantly at different azimuthal locations, indicating target wellbore 4 is not present. Accordingly, the detection of target wellbore 4 by the other technique may have been a false detection. In-situ calibration may then be performed as there is no target wellbore 4 present. However, if the standard deviation of the difference is greater than the threshold, then the difference in signals is changing significantly at different azimuthal locations, indicating target wellbore 4 is present.

The second validation method 80 shown on FIG. 11 may also return a gain coefficient. This gain coefficient may be used for calibration, for example, even when target wellbore 4 may be present. However, accuracy of second validation method 80 for calibration may be limited as it does not consider the possible gain offsets. The presence of second wellbore 14 may also limit the accuracy of second validation method 80 if used for calibration even when target wellbore 4 is present. Thus, calibration of electromagnetic ranging system 2 without a target well may further increase accuracy if in-situ calibration.

As previously described, in situ calibration may be performed where there is no other well (e.g., target wellbore 4) present. Techniques have been described previously for determining whether there is another wellbore present. In situ calibration may include calculating gain coefficient of the electromagnetic ranging system 2. If no other well is present, the gain coefficient may be calculated in situ using known formation properties, for example. In addition to the multiplicative gain coefficient, gain offset may also be calculated in situ. The gain coefficient and optionally the gain offset may then be used to calibrate electromagnetic ranging system 2. By way of example, calibrating the electromagnetic ranging system 2 may comprise applying calibration coefficients, such as gain coefficient and optionally the gain offset, to measured signals. Calculation of gain coefficient may include taking a ratio of a modeled signal $M^\infty$ and a measured signal $S_i$ at a time where target wellbore 4 is not present. The modeled signal $M^\infty$ may be calculated, for example, using a forward model. If multiple data points are available, calculation of gain coefficient may include taking a ratio of the difference of a modeled signal $M^\infty$ at a first time and a modeled signal $M^\infty$ at a second time and the difference of a measured signal $S_i$ at the first time and a measured signal $S_i$ at the second time.

Figure 12:
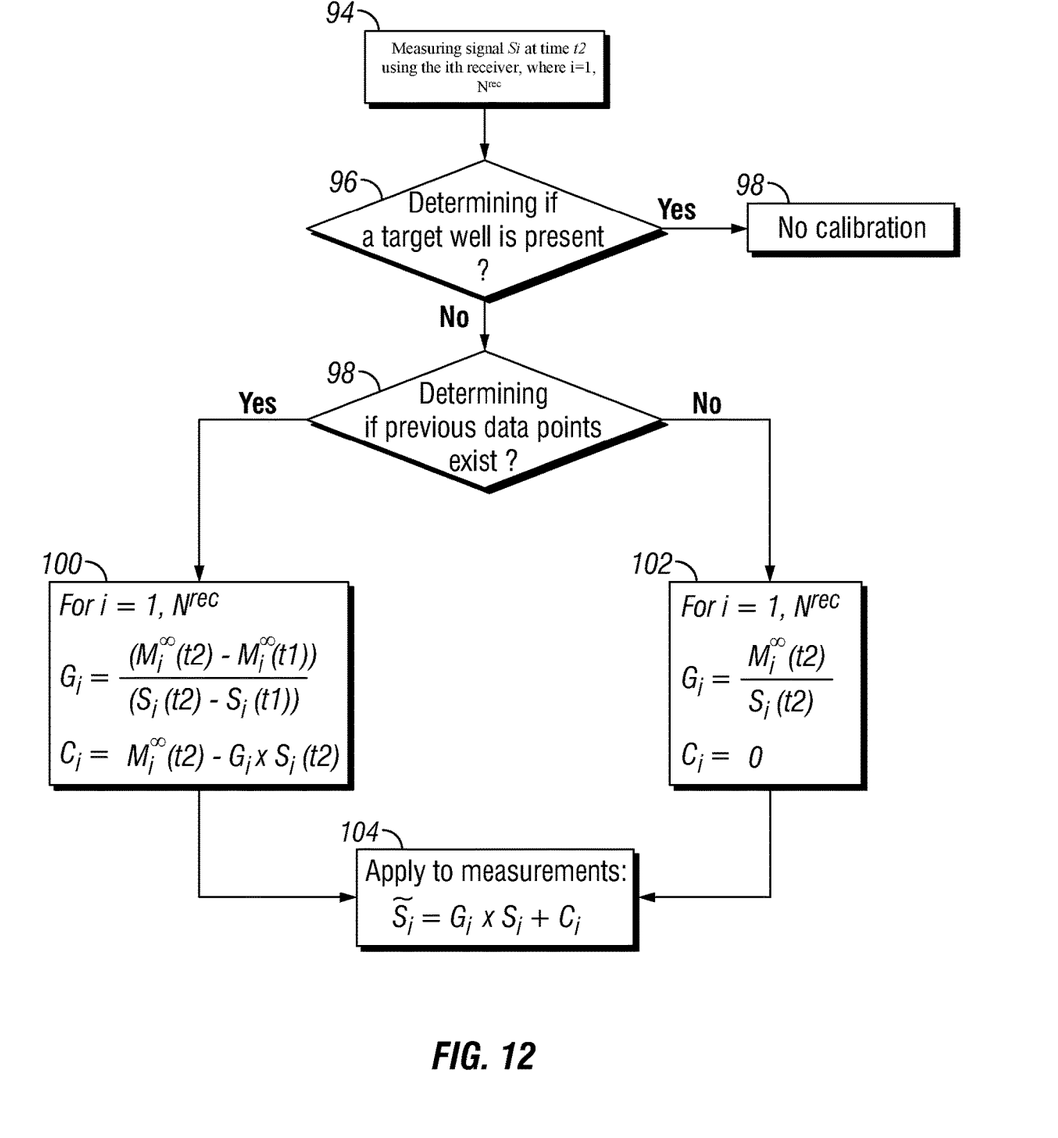
FIG. 12 illustrates a method for in situ calibration of an electromagnetic ranging tool.

Referring now to FIG. 12, an example of an in-situ calibration method 92 is illustrated. The in-situ calibration method 92 may be used in the calibration of an electromagnetic ranging tool 24, for example. At block 94, in-situ calibration method 92 may comprise measuring a signal at time t2. The measured signal may be denoted as $S_i$. The signal may be measured at a number of different receivers 32 denoted as $N^{rec}$. The signal may be measured by receivers 32 on electromagnetic ranging tool 24. The electromagnetic ranging tool 24 may be used to measure a signal in second wellbore 14 for example, by transmitting an electromagnetic filed using transmitter 30 and then recording electromagnetic field measuring using receivers 32. At block 96, in situ calibration method 92 may comprise determining if target wellbore 4 is present. Techniques for determining the presence of target wellbore 4 are discussed above. If it is determined that the target wellbore 4 is present, then no calibration is performed, as shown at block 96. If target wellbore 4 is not present, in-situ calibration method 92 may move to block 98 for determining if a previous data point exists. By way of example, a previous data point may exist where a signal previously measured at time t1 and corresponding to a different set of formation properties than the measured signal $S_i$ at time t2. If a prior data point exist at time t1, gain coefficient and gain offset may be calculated using the measured signal $S_i$ at time t1 and at time t2, at block 100. For example, Equation (6), below, may be used to calculate gain and offset.

$$\text{For } i = 1, N^{rec} \quad (6)$$
$$G_i = \frac{(M_i^\infty(t2) - M_i^\infty(t1))}{(S_i(t2) - S_i(t1))}$$
$$C_i = M_i^\infty(t2) - G_i \times S_i(t2)$$

Wherein $N^{rec}$ may denote the number of receivers 32 at which measurements have been recorded so that calibration may be repeated for each of the receivers 32, $G_i$ is the gain at receiver i, $C_i$ is the offset for receiver i, $M_i^\infty(t)$ may be the modeled signal at time t for receiver i, and $S_i(t)$ may be the measured signal at receiver/at time t. If the measured signals $S_i$ may depend on other parameters, such as frequency, a calibration coefficient for each different measurement set may be calculated. By way of example, gain coefficient and optional gain offset may be calculated for each frequency of a set of frequencies. If no previous data point exists, the in situ calibration method 92 may move to block 102 for determining gain coefficient as a ratio of a modeled signal $M_i^\infty(t2)$ to measured signal $S_i(t2)$ and the gain offset may be set to 0 as shown below in Equation (7), for calibration.

$$\text{For } i = 1, N^{rec} \quad (7)$$
$$G_i = \frac{M_i^\infty(t2)}{S_i(t2)}$$
$$C_i = 0$$

After determination of calibration coefficients, the measured signals $S_i$ from electromagnetic ranging system 2 may be calibrated, at block 104. For example, the calibration coefficients, such as gain coefficient and gain offset, may be applied to measured signals $S_i$ to calculate a calibrated signal $\tilde{S}_i$ as shown below in Equation (8):

$$\tilde{S}_i = G_i \times S_i + C_i \quad (8)$$

Accordingly, the disclosed methods and systems may be used for an in-situ calibration. It should be understood that the disclosed methods and systems may be modified as would be apparent to those of ordinary skill in the art with the benefit of this disclosure. For example, calibration may not be performed until at least two different data points for zones of subterranean formation 8 without a target wellbore 4 have been identified. If more than two data points have been obtained in a time frame where calibration may be applied, all those data points may be used in the calibration. A line fitting technique may be used if there are more than two data points. For example, a line that fits the data points by minimizing the error in the least square sense may be utilized, which may increase the accuracy of calibration by further reducing noise effects.

A method for determining a target well may comprise taking a first measurement with an electromagnetic ranging tool at a first position, calculating a first modeled signal, and calculating a calibration for the electromagnetic ranging tool from at least the first measurement and the first modeled signal. The method may further comprise taking a second measurement with the electromagnetic ranging tool at a second position, calculating a calibrated measurement using at least the second measurement, and determining a distance, direction, and/or orientation to a target wellbore using at least the calibrated measurement. This method may include any of the various features of the compositions, methods, and systems disclosed herein, including one or more of the following features in any combination. The first position may be downhole. The first position may be at a surface of a second wellbore. The electromagnetic ranging tool may comprise a source electrode, a return electrode, and a resistor box connected between the source electrode and the return electrode. Additionally, the method may comprise applying a voltage or a current between the source electrode and the return electrode and measuring a complex impedance. The step of determining a distance, a direction and/or an orientation to a target wellbore may comprises matching a second modeled signal to the second measurement, wherein the second modeled signal is calculated using a forward model, and inputting at least one of a formation resistivity, a mud resistivity, or a borehole diameter into the forward model. The step of electromagnetic ranging tool may be in a bottom hole assembly, wherein the method further comprises measuring formation resistivity with a resistivity tool in the bottom hole assembly. The step of calculating a calibration for the electromagnetic ranging tool may comprise calculating a gain of the electromagnetic ranging tool, wherein the gain is applied to the calibrated measurement. The electromagnetic ranging tool may be disposed in a second wellbore, the method further comprising adjusting one or more drilling parameters of the second wellbore based on the distance, direction, and/or orientation to the target wellbore that was previously determined. The step of calculating the gain may comprise calculating a ratio of the first modeled signal and a measured signal. The step of calculating the gain may comprise calculating a ratio of a difference between a second measured signal at a second time and the first measured signal at a first time and a difference between the second measurement at the second time and the first measurement at the first time to find a multiplicative gain coefficient. The step of calculating a calibration may comprise calculating a gain offset of the electromagnetic ranging tool. The method may further comprise determining whether the target wellbore is present, wherein the step of determining whether the target wellbore may be present comprises calculating whether a difference between the first measurement and the first modeled signal exceeds a threshold, and evaluating whether the determination of the presence of the target wellbore is a false detection. In examples, the method may further comprising calibrating the electromagnetic ranging tool at a surface before disposing the electromagnetic ranging tool in a second wellbore. A resistivity tool may be disposed between a transmitter and a receiver of the electromagnetic ranging tool. The method may further comprise interpolating through at least a geological model and resistivity information from the resistivity tool, and further wherein the interpolation is inserted into the first measurement. The step of calculating a calibration may comprise identifying a measured signal and a modeled signal by an azimuthal location of recording, determining a standard deviation of the azimuthal location of the measured signal and the modeled signal, and comparing the standard deviation to a threshold. The step of calculating a calibration may comprise identifying a measured signal by a sinusoidal variation, dividing the measured signal into different parts, calculating a gain coefficient using a forward model, applying the gain coefficient to a modeled signal, subtracting the measured signed from the modeled signal, and comparing a standard deviation of the modeled signal and the measured signal to a threshold.

An electromagnetic ranging system for determine the location of a target well may comprise an electromagnetic ranging tool and an information handling system coupled to the electromagnetic ranging tool, wherein the information handling system is operable to calibrate the electromagnetic ranging tool from measurements from use of the electromagnetic ranging tool in a wellbore, calculate a gain of the electromagnetic ranging tool, and apply the gain to a measured signal from the electromagnetic ranging tool. The system may include any of the various features of the compositions, methods, and system disclosed herein, including one or more of the following features in any combination. The electromagnetic ranging tool may comprise a transmitter and a receiver, wherein the transmitter may comprise a coil, a wire antenna, a toroidal antenna, or azimuthal button electrode and wherein the receiver comprises a coil or a magnetometer. The information handling system may be further operable to determine whether a target wellbore is present and determine whether the determination of the presence of the target wellbore is a false detection. The electromagnetic ranging tool may comprises a transmitter and a receiver, wherein a resistivity tool may be disposed between the transmitter and the receiver. The electromagnetic ranging tool may comprise a source electrode and a return electrode, wherein the electromagnetic ranging system may comprise a resistor box connected between the source electrode and the return electrode. The information handling system may be downhole or uphole.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for calibrating an electromagnetic ranging tool comprising:
   disposing the electromagnetic ranging tool into a wellbore;
   measuring a first set of signals with the electromagnetic ranging tool at a first position within the wellbore;
   calculating a set of-modeled signals corresponding to the first set of signals;
   determining if a target well is present from the first set of signals and the set of modeled signals;
   determining a set of gain coefficients as a ratio of the set of modeled signals to the first set of signals if the target well is not present, wherein the set of gain coefficients represents a linear relationship between the set of modeled signals and the first set of signals;
   setting a set of gain offsets of the first set of signals to zero;
   applying the set of gain coefficients and the set of gain offsets to one or more subsequent measurement data to calibrate the one or more subsequent measurement data; and
   determining a distance, a direction, and an orientation to the target well from the one or more subsequent measurement data in situ.

2. The method of claim 1, further comprising measuring formation resistivity with a resistivity tool, wherein a resistivity tool is disposed between a transmitter and a receiver of the electromagnetic ranging tool and interpolating the resistivity through at least a geological model.

3. The method of claim 1, further comprising adjusting one or more drilling parameters based at least partially on the distance, direction, or orientation to the target wellbore that was previously determined.

4. The method of claim 1, further comprising determining whether the target wellbore is present by calculating whether a set of differences between the first set of signals and the set of modeled signals exceeds a set of thresholds.

5. The method of claim 1, further comprising calibrating the electromagnetic ranging tool at a surface before disposing the electromagnetic ranging tool in the wellbore.

6. The method of claim 1, further comprising determining if a target wellbore is present by obtaining a set of differences of the set of modeled signals and a set of measured signals at two or more azimuthal locations determining a standard deviation of the set of differences at two or more azimuthal locations and comparing the standard deviation to a threshold.

7. The method of claim 1, further comprising determining if a target wellbore is present by measuring the first set of signals at two or more azimuthal points, dividing the azimuthal variation of the first set of signals into uniform, sinusoidally varying and double sinusoidally varying parts, calculating a second set of gain coefficients using the uniform and sinusoidal varying portions and the set of modeled signals using a forward model, applying the second set of gain coefficients to the set of modeled signals, subtracting the first set of signals from the set of modeled signals multiplied by the second set of gain coefficients, and comparing a standard deviation of the subtraction to a threshold.

8. An electromagnetic ranging system comprising:
   the electromagnetic ranging tool comprising:
      a transmitter configured to transmit an electromagnetic signal;
      a receiver configured to record a first set of signals; and
   an information handling system coupled to the electromagnetic ranging tool, wherein the information handling system is operable to:
      calculate a set of modeled signals corresponding to the first set of signals;
      determine if a target well is present from the first set of signals and the set of modeled signals;
      determine a set of gain coefficients as a ratio of the set of modeled signals to the first set of signals if the target well is not present; and
      set a set of gain offsets of the first set of signals to zero;
      apply the set of gain coefficients and the set of gain offsets to one or more subsequent measurement data to calibrate the one or more subsequent measurement data; and
      determine a distance, a direction, and an orientation to the target well from the one or more subsequent measurements data in situ.

9. The electromagnetic ranging system of claim 8, wherein the transmitter comprises a coil, a wire antenna, a toroidal antenna, or azimuthal button electrode and wherein the receiver comprises a coil or a magnetometer.

10. The electromagnetic ranging system of claim 8, wherein the information handling system is further operable to determine whether the target wellbore is present and if the target wellbore is a false detection.

11. The electromagnetic ranging system of claim 8, wherein the electromagnetic ranging tool comprises a resistivity tool disposed between the transmitter and the receiver.

12. The electromagnetic ranging system of claim 8, wherein the electromagnetic ranging tool comprises a source electrode and a return electrode, wherein the electromagnetic ranging system comprises a resistor box connected between the source electrode and the return electrode.

13. A method for calibrating an electromagnetic ranging tool comprising:

disposing the electromagnetic ranging tool into a wellbore;
measuring a first set of signals with the electromagnetic ranging tool at a first position within the wellbore;
calculating a first set of modeled signals corresponding to the first set of signals;
determining if a target well is present based on the first set of signals and the first set of modeled signals;
storing the first set of signals and the first set of modeled signals if the target well is not present;
moving the electromagnetic ranging tool in the wellbore;
measuring a second set of signals with the electromagnetic ranging tool at a second position within the wellbore if the target well is not present;
calculating a second set of modeled signals at the second position corresponding to the second set of signals;
determining if the target well is present based on the second set of signals and the second set of modeled signals;
determining a set of gain coefficients, if the target well is not present, as a set of ratios between a set of differences of the second set of modeled signals and the first set of modeled signals teand a set of differences of the second set of signals and the first set of signals; and
determining a set of gain offsets, if the target well is not present, as a set of differences between the second set of modeled signals and the set of gain coefficients multiplied by the second set of signals.

14. The method of claim 13, wherein the set of gain coefficients and the set of gain offsets are applied to one or more subsequent measurements data to calibrate the one or more subsequent measurements data and determining distance, direction, and orientation to the target well from the one or more subsequent measurements data in situ.

15. The method of claim 13, further comprising determining whether the target wellbore is present by calculating whether a set of differences between the first set of signals and the first set of modeled signals exceeds a set of thresholds.

16. The method of claim 13, further comprising determining if a target wellbore is present by obtaining a set of differences of the first set of modeled signals and the set of measured signals at two or more azimuthal locations determining a standard deviation of the set of differences at two or more azimuthal locations and comparing the standard deviation to a threshold.

17. The method of claim 13, further comprising determining if a target wellbore is present by measuring the first set of signals at two or more azimuthal points, dividing the azimuthal variation of the first set of signals into uniform, sinusoidally varying and double sinusoidally varying parts, calculating a second set of gain coefficients using the uniform and sinusoidal varying portions and the first set of modeled signals using a forward model, applying the second set of gain coefficients to the first set of modeled signals, subtracting the first set of signals from the first set of modeled signals multiplied by the set of gain coefficients, and comparing a standard deviation of the subtraction to a threshold.

* * * * *